United States Patent [19]

Liu

[11] Patent Number: 4,482,661

[45] Date of Patent: Nov. 13, 1984

[54] ALUMINIZED EPOXY-URETHANE COATING

[75] Inventor: Tony Y. Liu, East Windsor, N.J.

[73] Assignee: The Valspar Corporation, Minneapolis, Minn.

[21] Appl. No.: 513,896

[22] Filed: Jul. 14, 1983

[51] Int. Cl.³ ............................................... C08K 3/08
[52] U.S. Cl. .................................... 523/439; 523/457; 524/906
[58] Field of Search ....................... 523/439, 457, 177; 524/906

[56] References Cited

U.S. PATENT DOCUMENTS 4,282,123  8/1981  Ilaria ..................................... 528/59
4,342,674  8/1982  Morgan ............................... 523/443

*Primary Examiner*—Lewis T. Jacobs

[57] ABSTRACT

A two-component coating system comprising Component A, (1) the reaction product of a diglycidyl ether of bisphenol A, a polyfunctional acid and a mixture of a high base strength and a low base strength amine; (2) a cumarone-indene resin; (3) a thixotropic agent; (4) a lamellar extender; and (5) a non-leafing aluminum paste; and Component B comprises a urethane prepolymer based on a flexible polyhydroxy functional oligomer and a diisocyanate.

4 Claims, No Drawings

ALUMINIZED EPOXY-URETHANE COATING

BACKGROUND OF THE INVENTION

This invention is concerned with a high build maintenance coating for application over various surface preparations on steel substrates. The coating is designed for use as a high performance coating in heavy industrial environments. The two-component system of the present invention is particularly adapted for coating structures or areas where sandblasting is prohibited or impractical, and where the commonly used conventional coatings compatible with hand or power tool cleaning do not provide adequate protection or performance. It provides excellent low temperature curing properties.

In U.S. Pat. Nos. 4,282,123 and 4,342,674 two-component systems employing some of the materials employed herein are disclosed. It has been found, however, that the corrosion resistance and performance of the subject coating composition is superior thereto.

SUMMARY OF THE INVENTION

This invention provides a two-component coating composition wherein:

Component A comprises (1) the reaction product of a diglycidyl ether of bisphenol A, having an epoxy equivalent weight between about 170 and about 2,000, a polyfunctional acid and a mixture of a high base strength and a low base strength amine; (2) a cumarone-indene resin having a softening point between about 40° F. and 82° F.; (3) a thixotropic agent; (4) a lamellar extender; and (5) a non-leafing aluminum paste; and Component B comprises a urethane prepolymer based on a flexible polyhydroxy functional oligomer and a diisocyanate;

said Components A and B being mixed at the time of application.

DETAILED DESCRIPTION OF THE INVENTION

The coating compositions of this invention are composed of two components A and B which are mixed in a ratio of from 3:1 to 1:3 just prior to application. After mixing the components, the composition will have a pot life of approximately 3-4 hours at room temperature. The pot life obviously is somewhat temperature dependent, with a shorter pot life as temperature increases. In practice, the mixed components are applied to a sandblasted metal surface or a hand cleaned metal surface in any suitable manner.

As indicated above, Component A of the composition contains a modified epoxy resin, a cumarone-indene resin, a thixotropic agent, non-leafing aluminum paste, a lamellar extender and suitable solvents. Other coloring pigments can, optionally, be present.

The epoxy resins are the diglycidyl ethers of bisphenols, a class of compounds which are constituted by a pair of phenolic groups interlinked through an intervening aliphatic bridge. While any of the bidphenols may be used, the compound 2,2-bis (p-hydroxyphenyl) propane, commonly known as bisphenol A, is more widely available in commerce and is preferred.

The epoxy resins will have an epoxy equivalent weight of between about 170 and about 2,000 and an epoxy value between about 0.60 and about 0.05. The preferred epoxy resins, i.e., those made from bisphenol A will have two epoxy groups per molecule. A preferred commercially available epoxy resin is EPON 829.

The polyfunctional acid reacted with the epoxy resin include aliphatic dicarboxylic acids having the structure $HOOC(CH_2)_nCOOH$, wherein n is 2–8. The aliphatic dicarboxylic acids include adipic acid, pimelic acid, suberic acid, azelaic acid and sebacic acid.

It is also within the contemplation of this invention to use dimerized unsaturated fatty acids up to and including 36 carbon atom dimer acids and diacids resulting from the Diels-Alder reaction of acrylic acid or methacrylic acid with conjugated unsaturated fatty acids having up to 18 carbon atoms. Also contemplated as polyfunctional acids are acid-terminated polyesters containing at least 40% of components derived from $C_4$–$C_9$ alkanedioic acids and carboxylic acid terminal polybutadiene and copolymers of butadiene with acrylonitrile.

The high base strength amines are the aliphatic amines. Suitable aliphatic amines include the aliphatic and cycloaliphatic, primary, secondary and tertiary amines, preferably containing up to 15 carbon atoms, such as methylamine, ethylamine, propylamine, isopropylamine, butylamine, isobutylamine, sec-butylamine, tert-butylamine, amylamine, isoamylamine, sec-amylamine, tert-amylamine, hexylamine, heptylamine, diisopropylamine, dibutylamine, diisobutylamine, trimethylamine, triethylamine, tripropylamine, tributylamine, triisobutylamine, cyclohexylamine, and cycloheptylamine.

The low base strength amines are the aromatic amines. Suitable aromatic amines include the primary, secondary and tertiary amines such as aniline, ortho-, meta-, and paratoluidine, the xylidines, the phenylenediamines, N-methylaniline, N-ethylaniline, dimethylaniline, triphenylamine, alpha-naphthylamine, beta-naphthylamine, pyridine and substituted pyridines and benzylamine.

The epoxy resin is reacted with the polyfunctional acid, the high base strength amine, and the low base strength amine in an amount to react with from 0.5 to all the epoxy groups. The amount of polyfunctional acid reacted is 0.1–0.6 equivalent per 1.0 equivalent of epoxy resin. The amount of each of the high base strength amine and the low base strength amine reacted is 0.1–0.6 equivalent per 1.0 equivalent of epoxy resin. The weight ratio of the high base strength to the low base strength amine can be between 2:1 and 1:2 depending upon the desired rate of cure for the intended application.

Although a catalyst is not essential, it may be desired to use a suitable catalyst in the reaction between the epoxy resin and the polyfunctional acid. Suitable catalysts are tertiary amines, tertiary phosphines, and quaternary ammonium and phosphonium compounds.

The polyfunctional acid, the low base strength amine, and the high base strength amine are readily adducted to the epoxy resin, usually in sequence, at temperatures in the order of about 163° C. in about 2–3 hours.

A modified epoxy resin for use in Component A was prepared using the following recipe:

| | |
|---|---|
| EPON 829* | 70.33% by wt. |
| Dimer acid | 19.84% by wt. |
| Aniline | 2.95–8.85% by wt. |
| Cyclohexylamine | 0.98–6.88% by wt. |
| | 100.00% by wt. |

*Epoxy equivalent weight about 193–203.

The formulation procedure for the modified epoxy resin is as follows:

1. Charge Epon 829 and dimer acid (Empol 1016) to a kettle equipped with agitation and inert gas.
2. Raise the temperature to about 163° C. and hold for about 45 minutes.
3. Stop the heating and begin addition of the aniline at a steady rate over a 15 minute period. Following addition of the aniline, add the cyclohexylamine also over a 15 minute period.
4. Hold the reaction mixture for 90 minutes at 163° C. after complete addition of the cyclohexylamine.
5. Reduce the composition to 50%-80% solids with cellosolve acetate and ethylbenzene 80/20 wt.%. Maintain the temperature above 121° C. during the addition of these solvents.

In formulating Component A, a 50-80% solids solution of the modified epoxy resin, described immediately above, is mixed with a cumarone-indene resin having a softening point of from about 40°-82° F. in an amount of from 3.0 to 12.0 weight percent based on total solids and a thixotropic agent such as castor wax, e.g., 24% solids dissolved in mineral spirits or xylene. Thereafter a lamellar extender, such as water ground mica (325mesh) or a magnesium silicate talc extender is intimately mixed in using suitable equipment. The extender component of the composition can be present in from about 60-80 weight percent based on the total solids of the composition. Thereafter, a non-leafing aluminum powder in paste form is separately blended with a portion of the modified epoxy resin solution and this combination is then thoroughly intermixed with the balance of the composition.

The weight percentage ranges of the constituents in Component A are:

| Modified epoxy solution (55% solids) | 41.0 to 50.4 wt. % |
|---|---|
| Cumarome-indene resin | 3.0 to 12.0 wt. % |
| Thixotropic agent | 0.6 to 0.8 wt. % |
| Lamellar extender | 1.0 to 2.2 wt. % |
| Pigment or filler | 0 to 2.2 wt. % |
| Non-leafing aluminum paste | 20.0 to 35.0 wt. % |
| Total solvents | 10.0 to 13.5 wt. % |

In the above-described Component A formulation the principal solvents are cellosolve acetate and ethylbenzene. It is to be understood, however, that additional or substitute solvents can be employed to facilitate or assist in solution or dispersion of the several constituents. Examples of such solvents are a $C_1-C_6$ alkoxyethyl acetate, such as ethoxyethyl acetate, an alkyl ketone such as methylethyl ketone, ethyl acetate, propylene glycol methyl ether acetate, aromatic hydrocarbons such as toluene, ethylbenzene, and xylene, and mineral spirits. As indicated, the amount of solvent used will be sufficient to adjust the solids content of Component A to about 50-80 weight percent.

Component B comprises a long dihydroxy oligomer having isocyanate end groups.

These are adducts containing flexible segments and are prepared by selectively reacting one of the two isocyanate groups of a diisocyanate such as toluene diisocyanate, isophorone diisocyanate, aliphatic hexamethylene diisocyanate, diphenylmethane diisocyanate or aromatic hexamethylene diisocyanate with the terminal hydroxyl groups of flexible polyfunctional oligomers such as:

Hydroxy-terminated polyalkylene oxides formed by polymerization of ethylene, propylene or butylene oxides. Hydroxy-terminated polyalkylene oxides copolymerized with minor amounts of trimethylol ethane, trimethylol propane, gylcerol or pentaerythritol to form lightly branched structures.

Hydroxy-terminated polyesters containing at least 40% of components which are $C_4-C_9$ alkane diols and alkane dioic acids.

Hydroxy-terminated polybutadienes.

EXAMPLE 1

Component A

A 100 gallon formulation of Component A is prepared in a tank equipped with a high shear disperser as follows:

180 pounds (21.03 gallons) of the above-described epoxy resin as a 55% solids solution is intimately mixed with 86.4 pounds (9.60 gallons) of a cumarone-indene resin having a softening point of 40°-80° F. and 7.1 pounds (0.97 gallons) of a 24% solids solution of castor wax in xylene. During mixing the composition was warmed to 100° F. Thereafter, 18.0 pounds (1.41 gallons) of a phthalocyanine blue pigment and 18.0 pounds (0.77 gallons) of a water ground mica (325 mesh) were added to the tank and mixed until the degree of dispersion was 2 NS Hegman gauge units. Thereafter, 255.9 pounds (30.60 gallons) of additional modified epoxy resin and 271.7 pounds (22.03 gallons) of non-leafing aluminum paste (65 weight percent aluminum/35 weight percent mineral spirits) were intimately mixed and thoroughly dispersed into the tank contents. This mixture was let down with 115.7 pounds (14.28 gallons) of cellosolve acetate solvent.

EXAMPLE 2

Component B

This aromatic polyisocyanate adduct is prepared by selectively reacting one of the two isocyanate groups of toluene diisocyanate (TDI) with the terminal hydroxy group of trimethylol propane. 3 moles of the TDI is reacted with 1 mole of trimethylol propane to produce a polyisocyanate adduct which contains, on a solid basis, less than about 7% of the original TDI monomer. This is reduced to 75% solids with ethyl acetate to yield a solution of 990.1 pounds (100 gallons). This isocyanate adduct solution has a NCO content of 16.5% and an average equivalent weight of 255.

EXAMPLE 3

Coating Composition 70.0 gallons of Component A is intimately mixed with 30.0 gallons of Component B. The resultant composition has a solids content of about 50.0 weight percent and a pot life of about 3-4 hours at room temperature.

Sandblasted steel panels were coated to 5 mils dry film thickness with the coating composition of Example 3 and dried for 7 days in air. The panels were scribed and subjected to a salt spray consisting of 5% salt in water. After 3,000 hours no effect was noted on any portion of the panels. After 3,500 hours, approximately four one-eighth inch diameter corrosion blisters were noted in the scribed areas. This amounted to a comparatively small amount of corrosion under the circumstances. Wire brushed rusty steel panels were also coated with the composition of Example 3 and it was not until 3,500 hours that two comparatively small corrosion blisters were observed in scribed areas. Panels coated with the composition of Example 3 were also immersed in fresh water for a period of seven months. Sand blasted steel so coated showed no effect after seven months. Wire brushed rusty steel coated with the composition of Example 3 showed some rusting in scribed areas after the onset of the seventh month. Sand blasted steel panels coated with the composition of Example 3 were immersed in sea water for seven months without showing the effects of corrosion to any extent. Wire brushed rusty steel was immersed in sea water for seven months and, again, some rusting was apparent on scribed areas of the panels.

Panels coated with the composition of Example 3 have also shown no deterioration when immersed for three and one-half months in gasohol, ethyl alcohol, unleaded gasoline, toluene, 10% sodium hydroxide and 5% hydrochloric acid solutions. When used as a top coat over several primers, this product has presented excellent intercoat adhesion and no effect upon 2,500 hours salt spray testing.

Although the present invention has been descirbed with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A two-component coating composition wherein:

Component A comprises (1) the reaction product of a digylcidyl ether of bisphenol A, having an epoxy equivalent weight between about 170 and about 2,000, a polyfunctional acid in an amount of from about 0.1–0.6 equivalent per 1.0 equivalent of epoxy resin and a mixture of a high base strength aliphatic amine and a low base strength aromatic amine, the amount of each amine reacted is from about 0.1–0.6 equivalent per 1.0 equivalent of epoxy resin, the weight ratio of aliphatic amine to aromatic amine is from about 2:1 and 1:2; (2) from about 3.0 to 12.0 wt. % of a cumarone-indene resin having a softening point between about 40° F. and 82° F.; (3) a thickening proportion of a thixotropic agent; (4) an extending proportion of a lamellar extender; and (5) from about 20.0 to 35.0 wt. % of a non-leafing aluminum paste; and Component B comprises a urethane prepolymer based on a flexible polyhydroxy functional oligomer and a diisocyanate;

wherein said Components A and B are in a volume ratio of between about 1:3 and about 3:1 and mixed at the time of application.

2. The composition of claim 1 including a colored pigment.

3. The composition of claim 1 wherein in said Component A the modified epoxy resin has an epoxy equivalent weight between about 193 and about 203, said polyfunctional acid is dimer acid, said aliphatic amine is cyclohexylamine and said aromatic amine is aniline.

4. The composition of claim 3 wherein said Component B is a urethane prepolymer based on toluene diisocyanate reacted with the terminal hydroxyl group of trimethylol propane.

* * * * *